United States Patent [19]

Patterson

[11] Patent Number: 4,684,281

[45] Date of Patent: Aug. 4, 1987

[54] BICYCLE SHIFTER BOSS ASSEMBLY

[75] Inventor: Thomas C. Patterson, Westport, Conn.

[73] Assignee: Cannondale Corporation, Georgetown, Conn.

[21] Appl. No.: 769,577

[22] Filed: Aug. 26, 1985

[51] Int. Cl.[4] .......................... F16B 7/08; F16B 39/10
[52] U.S. Cl. .................................... 403/197; 403/200; 403/234; 411/93; 411/96; 411/129
[58] Field of Search ............... 403/200, 197, 191, 237, 403/234; 280/236; 74/475, 491, 489; 474/82; 411/19, 20, 122–124, 129–131, 93–96

[56] References Cited

U.S. PATENT DOCUMENTS

| | | | |
|---|---|---|---|
| 469,602 | 2/1892 | Shaw | 411/124 |
| 583,860 | 6/1897 | Olds | 403/191 |
| 2,130,252 | 9/1938 | Snell | 403/234 |
| 3,400,956 | 9/1968 | Buchwald | 411/122 |
| 3,693,469 | 9/1972 | Ozaki | 74/489 |
| 4,046,025 | 9/1977 | Ozaki | 74/489 |
| 4,434,679 | 3/1984 | Shimano | 74/489 |

Primary Examiner—Cornelius J. Husar
Assistant Examiner—Peter M. Cuomo
Attorney, Agent, or Firm—Brumbaugh, Graves, Donohue & Raymond

[57] ABSTRACT

A shifter boss mounting assembly includes a member threaded at each end and extending diametrically at least partway through a bicycle frame downtube formed with openings therein, a pair of shifter boss bases with inward surfaces conforming to the downtube outer surface, and a pair of shifter studs that extend through the base and a respective opening in the downtube and thread onto the corresponding threaded ends of the member. A projection on each base cooperates with an opening or indentation in the downtube to restrain the base from rotational movement. A lock washer or a plate keyed to cooperate with the base and the stud restrain the stud against unthreading when the shift levers are pivoted. Once mounted, the boss assembly is standardized in its external configuration to bosses adapted to receive standard commercial shift lever assemblies.

4 Claims, 5 Drawing Figures

BICYCLE SHIFTER BOSS ASSEMBLY

BACKGROUND OF THE INVENTION

Shifter bosses are two studs which are attached to the downtube of a bicycle frame. They serve as mounts for the shifter levers that are used to actuate the derailleurs during gear shifts.

The conventional way of mounting the shifter levers on the downtube of a bicycle frame is to braze mounting bosses onto the downtube. With steel bicycle frames, brazing is relatively simple and provides a durable attachment without significant diminishment of the mechanical properties of the steel tubing. Although generally reliable, brazing does have drawbacks. It requires skilled labor. Jigs and fixtures are required to hold the bosses on the tube. Extensive surface preparation is required to insure clean surfaces and a strong brazed joint. The heat required to braze weakens the tube. In the event the brazed joint or the boss itself breaks, the only way to repair the frame is to braze on a new boss. This requires repainting and the cost is high.

In the case of aluminum frames, which are becoming increasingly popular and in more widespread use, brazing of the shifter mounting bosses and other fittings to the aluminum tubes is impractical, if not impossible. Aluminum brazing alloys have melting temperatures that are relatively close to the melting point of the base metal and it is tricky, at best, to use torches to braze fittings on the aluminum tubes. Brazing in furnaces or molten salt baths is prohibitively expensive and causes various difficulties as far as the effect on mechanical properties of the aluminum and cleaning the end product are concerned. Welding the fittings to the aluminum tubing also presents problems, not only because of the effect of welding on the mechanical properties of the tubing and the difficulty of obtaining good quality welds between the tubing and the relatively small pieces involved but also because it is impractical to use machined bosses and die-cast bosses cannot be welded due to their porous structure.

The assignee of the present invention has had reasonably good results by using rivots and special adhesives to fasten the shifter bosses to the downtube. Unfortunately, however, the incidence of failure of these joints has been undesirably high.

An object of the present invention is to provide a simple, low-cost, reliable attachment between a bicycle frame downtube and shifter lever bosses. A further object is to provide such an attachment in a form that allows field repair and replacement.

SUMMARY OF THE INVENTION

The aforementioned object is achieved, in accordance with the present invention by a shifter boss assembly comprising a threaded rod or tube that extends substantially through a bicycle downtube to receive a shifter boss assembly threaded onto the rod or tube to clamp the boss assembly against the downtube. Typically two boss assemblies are supported on the downtube, one on each end of the rod or tube.

An annular mounting base includes a concave inner face matching and engaging the outer surface of the bicycle downtube such that it cannot rotate. The mounting base may, optionally, be further retained against rotational movement by a projection on the concave undersurface of the base keyed to an indentation or small hole in the downtube. A stud, which will form the shift lever assembly mounting boss, threads onto the rod or tube following location of the mounting base and clamps the base against the downtube. A lockwasher between the stud and the base inhibits relative rotation or in a preferred embodiment, a locking plate with a central, noncircular opening, fits onto a conforming noncircular outer surface of the stud, and mating provisions on this plate and the outwardly facing surface of the mounting base cooperate to prevent relative rotation between the plate and the mounting base, thereby preventing relative rotation of the stud, the mounting plate, and the threaded rod or tube.

The bosses formed by this assembly, thus secured, now receive the standard shift lever assembly in conventional fashion. The bosses will not break free of the bicycle downtube or work loose by unthreading when the shift levers are pivoted on the bosses. Brazing and welding have been avoided, and assembly, both initially or for replacement, is easy and inexpensive. Each stud has a cylindrical, smaller diameter portion that extends through the mounting base and a larger diameter portion that is adapted to receive conforming shift lever parts. A shoulder at the juncture between the larger and smaller diameter portions bears on the base and clamps the base against the downtube.

For a better understanding of the invention, reference may be made to the following description of the preferred embodiments, taken in conjunction with the accompanying drawings.

DESCRIPTION OF PREFERRED EMBODIMENTS

Figure 1:
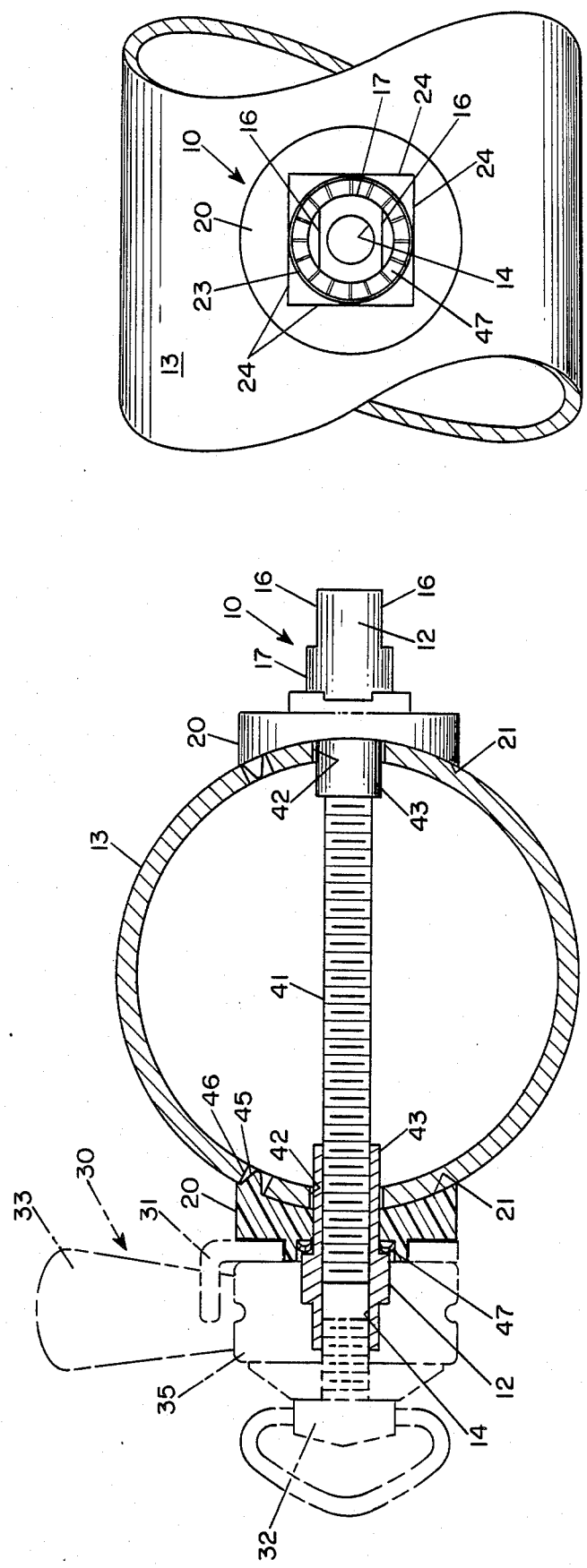
FIG. 1 is a view partially in section and partially in elevation of a shifter boss assembly according to the invention in place on a bicycle frame downtube.

In FIG. 1 a shifter boss assembly 10 mounts a pair of shifter studs 12 on a downtube 13 of a bicycle frame. The outermost ends of the studs 12 have a conventional configuration, which includes a threaded central opening 14, a pair of flats 16, and a cylindrical outer surface 17, for reception of a standard shift lever assembly.

A pair of molded plastic shifter boss bases 20 has surfaces 21 that conform to the outer cylindrical surface of the downtube 13. A square raised central portion 23 of each base 20 has side surfaces 24 at 90° to one another. As described thus far, the externally visible portions of the shifter boss mounting assembly form bosses that appear similar to known, conventional, integral shifter bosses brazed in place on, for example, steel bicycle frames. The outer cylindrical surfaces of the studs and the flats 16 fit openings provided in any of several commercially available shifter control lever assemblies, like the assembly 30 shown in phantom outline in FIG. 1. The outer surfaces 24 of the square raised central portion 23 of the base 20 likewise conforms to a square opening in a lever stop 31 of conventional, commercial shift lever assemblies. The threaded interior opening 14 of the stud receives the standard threaded lever adjusting bolt 32 that serves to tighten or loosen the frictional force acting against movement of a shift lever 33 secured to a central hub 35.

In accordance with this invention, a threaded rod 41 extends diametrically across the downtube 13 and has threaded ends that project from a pair of openings 42 formed for that purpose in the downtube. Inward cylindrical ends 43 of the studs project into the openings 42 and thread onto the ends of the rod 41 by virtue of the threaded bore 14 that opens entirely through each stud. In an equivalent construction, the assembly may comprise a tube extending through the downtube and having internal threads in the ends that receive externally threaded shanks on the studs. The rod 41 or the equivalent tube need not extend all the way through the downtube, and longer shanks on the studs can extend further into the downtube; the illustrated construction is, however, preferred because it is not necessary to "fish" for the free end of a short rod or tube inside the bicycle downtube.

On the cylindrical surface 21 of each base 20 a projection 45 enters a recess formed by another opening 46 in the tube 13 and serves as a means to prevent rotational movement of the base. The studs 12 are threaded tightly onto the ends of the rod 41, acting against a pair of lock washers 47 that inhibit their return rotational movement in the unthreading direction when a shift lever is pivoted. The assembly 10 thus clamps tightly against the downtube 13 to mount the bosses and ultimately the shift lever assemblies without brazing, welding, or gluing. In the illustrated design, the downtube is of large diameter (1.75"), so the cylindrical conforming inner face 21 of the base 20 is not very reliable in resisting rotation of the assembly; hence, the projection 45 is desirable. The projection can be omitted, particularly with small diameter downtubes.

Figure 5:
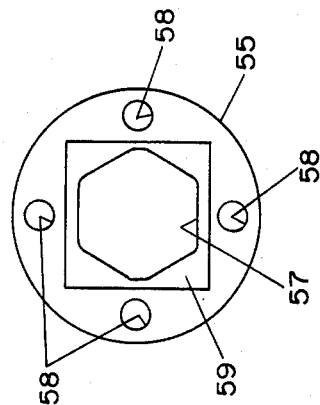
FIG. 5 is an elevation view of a shifter boss locking plate that secures the stud of FIG. 4 against rotation.
Figure 4:
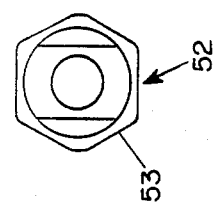
FIG. 4 is a side elevation view of a shifter stud of the FIG. 3 assembly.
Figure 3:
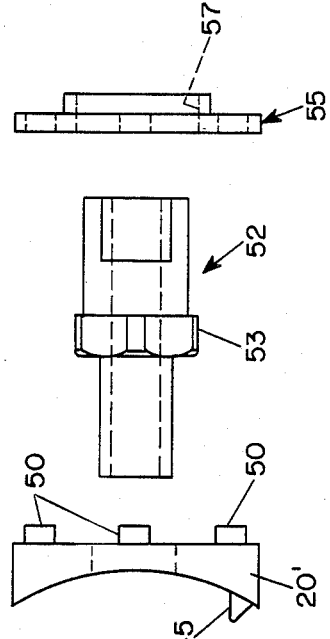
FIG. 3 is a fragmentary exploded view of a further embodiment of a shifter boss assembly according to the invention.

In FIGS. 3, 4 and 5 a further embodiment of the assembly is illustrated, like members bearing like reference numerals. Here, a base 20' is provided with four small cylindrical projections or pegs 50. A somewhat different stud 52 has a central hexagonal section 53. A locking plate 55 has a central hexagonal opening 57 that conforms to the outer surface of the hexagonal portion 53 of the stud 52. The plate 55 also includes four circular openings 58 that conform in location and size to the cylindrical projections or pegs 50 on the base 20.

Figure 2:
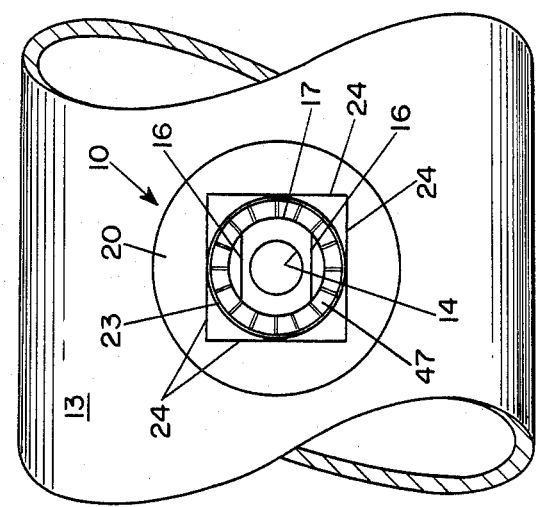
FIG. 2 is a fragmentary side elevation view of the assembly of FIG. 1.

The boss-forming assembly of FIGS. 3, 4 and 5 is mounted on the downtube 13 by location of the threaded rod 41 through the downtube as in FIG. 1 and placement of two of the bases 20 with their conforming surfaces against the downtube and their projections 45 in the openings 46. The studs 52 are threaded onto the ends of the rod 41 clamping the bases 20 against the downtube outer surface. The locking plate 55 is slipped into place so that its openings 58 receive the projections 50 while its hexagonal central opening 57 aligns with the hexagonal surface 53 of the stud 52. The projections 50 on the base 20, the openings 58 of the locking plate 55, and the conforming hexagonal surfaces 53 and 57 of the stud 52 and plate 55 serve as keying provisions that prevent unthreading of the stud when the shift levers are pivoted. Finally, a square, raised, central portion 59 of the locking plate acts in the manner of the raised central portion 24 of the base 20 of FIGS. 1 and 2. That is to say, the square central portion 59 receives a square opening through the lever stopper 31, shown in phantom in FIG. 1.

From the above, it will be seen that a secure, properly proportioned boss assembly can be affixed to the downtube of a bicycle frame, even an aluminum bicycle frame, without difficult and costly brazing or aluminum welding, and this can be done more securely than by gluing. Variations in the preferred embodiments will be apparent to those ordinarily skilled in the art without departure from the spirit and scope of the invention as set out in the appended claims. For example, other rotation inhibiting means or keying arrangements can be provided to protect against unthreading of the studs. It may occur for example, that rather than the opening 46 in the downtube, a slight indentation is preferred, to form the recess to receive the projection 45 that maintains base 20 in its proper disposition. The rod 41 (or the equivalent tube) can be threaded only at its ends or along its entire length, and the threaded openings into each end of the stud 12 that receive the threaded rod at one end and the threaded shaft of the adjusting bolt 32 at the other end need not be of equal diameter. These are just a few examples of modifications that may be made without departure from the invention as claimed.

I claim:

1. A shifter boss assembly for mounting at least one shift lever assembly on a tube of a bicycle frame comprising a member having threads at each end, the member being adapted to extend substantially diametrically at least partway through the tube with the threaded ends disposed adjacent openings in the tube, a mounting base adjacent one tube opening including an inner face having a shape complementary to and adapted to engage the outside surface of the tube adjacent the opening, an opening therethrough for alignment with the opening in the tube and for reception of the threaded rod end, base rotation inhibiting means formed on the inner face for inhibiting rotation of the base with respect to the tube, a shifter stud having a threaded portion at one end threaded onto the threads on one end of the member, a shoulder engaging the mounting base to clamp the mounting base against the tube, and an inward projection fitting through the opening in the base, the internally threaded hole of the stud opening inwardly to receive the threaded rod end and the inward projection on the stud terminating outwardly at the shoulder, an internally threaded opening at the other end of the stud opening outwardly away from the tube and located to receive an adjusting bolt of the shift lever assembly, stud rotation inhibiting means interacting between the base and the stud including a locking plate fitting over the stud in a keyed relation to a surface thereof for preventing relative rotation between the stud and the plate, interfitting keying means on the base and the plate for preventing relative rotation between the base and the plate, whereby the plate, base and stud are interlocked against relative rotational movement, and means associated with the threads on the other end of the member and with the tube for securing said other end of the member to the tube.

2. The shifter boss assembly according to claim 1 wherein the member extends entirely through the tube, each end projecting through an opening in the tube.

3. The shifter boss assembly according to claim 1 wherein the member is a rod having external threads at each end, wherein the rod extends entirely through the tube and the ends project through the tube openings and the said threaded portion of the stud is internally threaded.

4. The shifter boss assembly according to claim 1 wherein the base rotation inhibiting means comprises a projection on the inner surface of the base adapted to be received in a recess in the tube.

* * * * *